United States Patent [19]

Schenk et al.

[11] 4,393,132
[45] Jul. 12, 1983

[54] PHOTOGRAPHIC RECORDING MATERIAL WITH ARYLAZOCYANOACETIC ESTER DYE RELEASERS

[75] Inventors: Günther Schenk; Peter Bergthaller, both of Cologne; Gerhard Wolfrum, Leverkusen; Rudolf Stolzenburg, Duesseldorf, all of Fed. Rep. of Germany

[73] Assignee: Agfa-Gevaert Aktiengesellschaft, Leverkusen, Fed. Rep. of Germany

[21] Appl. No.: 371,076

[22] Filed: Apr. 23, 1982

[30] Foreign Application Priority Data

Apr. 30, 1981 [DE] Fed. Rep. of Germany ....... 3117243

[51] Int. Cl.³ .......................... G03C 5/54; G03C 7/00; G03C 1/10; G03C 1/40
[52] U.S. Cl. ..................................... 430/562; 430/223
[58] Field of Search ............... 430/222, 223, 225, 226, 430/561, 562, 241, 242

[56] References Cited

U.S. PATENT DOCUMENTS 3,134,672  5/1964  Blout et al. ......................... 430/225
3,994,731  11/1976  Maekawa et al. .................... 430/225
4,148,643  4/1979  Chapman et al. .................... 430/226

Primary Examiner—Richard L. Schilling
Attorney, Agent, or Firm—Connolly and Hutz

[57] ABSTRACT

For the production of light-fast yellow images (transfer images and retained images) by the dye diffusion transfer process dye-releasers are useful which on development release diffusible azo dyes which can complex with nickel or copper ions and which in one of their tautomeric forms correspond to the general formula:

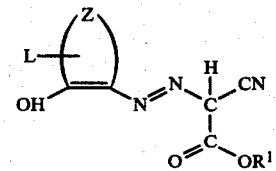

wherein
$R^1$ represents alkyl, alkenyl or cycloalkyl having up to 8 carbon atoms,
Z represents a radical required for completing a benzene or naphthalene ring; and
L represents a substituent having a group which results from the splitting from a carrier radical.

2 Claims, No Drawings

PHOTOGRAPHIC RECORDING MATERIAL WITH ARYLAZOCYANOACETIC ESTER DYE RELEASERS

This invention relates to a color photographic recording material for the production of colored images by the dye diffusion transfer process, which material contains a non-diffusing color-providing compound associated to at least one photosensitive silver halide emulsion layer, from which compound a diffusible azo dye capable of complexation is released during development.

The dye diffusion transfer process is based on the fact that, during development, an imagewise distribution of diffusible dyes is produced in a photosensitive element depending on a previous exposure and is transferred to an image-receiving layer. In some cases, the light-fastness of the dye images produced by a process of this type may be improved in known manner in that dyes which may be complexed with metal ions, for example tridentate azo dyes, are used which form stable dye-metal complexes by a subsequent treatment with suitable metal ions. The improvement in the light-fastness of azo dye-images which are obtained by the dye diffusion transfer process or by another photographic process, for example by the silver dye bleaching process, by complexing with metal ions is known, for example, from German Auslegeschrift Nos. 1,116,532 or 1,125,279.

U.S. Pat. No. 4,148,643 describes non-diffusing color-providing compounds (dye releasers) which, during development release diffusible and metallizable yellow azo dyes corresponding to the following general formula I:

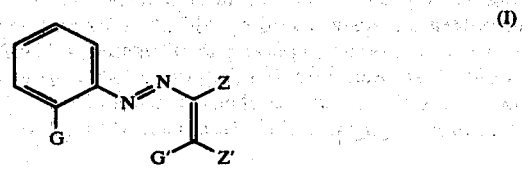

wherein
Z represents an electron-attracting group;
Z' represents an alkyl, aryl or optionally substituted amino group;
G represents a group capable of forming a metal chelate; and
G' represents OH or a hydrolysable precursor thereof.

The yellow azo dyes mentioned therein, they may also be considered as hydrazones (tautomers), include, among others, coupling products of diazonium salts with acetoacetanilide, benzoyl acetanilide, cyanoacetophenone, cyanoacetone, cyanoacetanilide and cyanopinacolin.

The high light-stability of the metal complexes is emphasised. When the hydrolysable precursors of G and G' are used for G and G', the tautomerism mentioned is suppressed, i.e. the chromophore is fixed in a tautomeric form characterized by lower extinction values by acylation of the group G', blocking the carbonyl group. The use of this "shifted" form prevents the filter effect of the dye resulting in a loss of photographic sensitivity.

However, it is known that dyes of the hydrazone type which are shifted by acylation are not stable, but that, when they are stored in the presence of residual moisture in a layer of gelatin, they gradually become deacylated, so that the optical transmission of the layer is gradually reduced during storage and the sensitivity of the associated blue-sensitive silver halide emulsion decreases.

Thus, it is desirable to use monoazo dyes of the so-called "tridentate type" which may be subsequently complexed and which have a greatly reduced absorption even without blocking of the carbonyl groups by acylation (in the form of an acylated enol group, as described in U.S. Pat. No. 4,148,643) and which only reach the high extinction of the image dye complex after the action of the complexing metal ion, preferably a nickel or copper ion.

It has been found that the object may be achieved in a particularly simple manner when non-diffusing coupling products of suitable diazonium salts with cyanoactic esters are used as the dye-releasers.

SUMMARY OF THE INVENTION

The present invention provides a color photographic recording material for the production of colored images by the dye diffusion transfer process, which material contains a non-diffusing color-providing compound associated to at least one photosensitive silver halide emulsion layer, from which compound a diffusible azo dye which may be complexed by metal ions is released under the conditions of alkaline development as a function of the development of the silver halide emulsion layer, characterized in that the azo dye corresponds to the following general formula II in one of the tautomeric forms thereof:

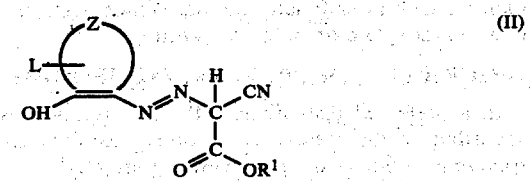

wherein
$R^1$ represents alkyl, alkenyl or cycloalkyl having up to 8 carbon atoms;
Z represents a radical for the completion of a benzene or naphthalene ring; and
L represents a substituent having a group which results from the splitting from a carrier radical.

The alkyl radical represented by $R^1$ may be branched or unbranched and may optionally contain other substituents, e.g. hydroxyl, alkoxy, aroxy, cyano or aryl groups. Examples of $R^1$ are methyl, benzyl, ethyl, hydroxyethyl, methoxyethyl, phenoxyethyl, cyanoethyl, phenethyl, propyl, isopropyl, hydroxypropyl, allyl, n-butyl, isobutyl, sec.-butyl, pentyl and isomers thereof including neopentyl.

Examples of cycloalkyl radicals represented by $R^1$ are cyclopentyl and cyclohexyl.

The benzene or naphthalene ring completed by Z may carry other substituents $R^2$, $R^3$ in addition to the azo group, the OH group and the substituent L, for example, halogen or alkyl, alkoxy or acylamino groups, preferably not having more than 3 carbon atoms, also $-NO_2$, $-CN$, $-CF_3$, alkylsulfonyl, arylsulfonyl, carbonamidoalkyl or alkoxycarbonyl groups.

The substituent L represents a group resulting by cleavage from a redox-active carrier radical or it contains a group of this type. Since only the presence of a group of this type is essentially important, the structure of the entire substituent L is not subject to any restrictions, apart from the fact that the substituent L must not be too bulky in the interest of the required high diffusion rate of the released azo dye. Examples of suitable substituents L are sulfinate, sulfamoyl or phenolic hydroxyl (phenolate) groups which are either directly linked to the ring completed by Z or are linked via an intermediate member which then forms an integrating component of the substituent L. Examples of suitable intermediate members are alkylene groups, arylene groups and N-phenylsulfamoyl or N-phenylcarbamoyl groups corresponding to the following general formula:

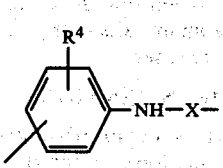

wherein
X represents —SO$_2$— or —CO—; and
R$^4$ represents, for example, hydrogen, chlorine, methyl or methoxy.

Furthermore, the dyes of formula II in the form of the groups L, R$^2$, R$^3$ or in the form of components of these groups are provided with suitable functional groups to increase the color strength and to adjust a favourable diffusion and mordanting behaviour, for example, being provided with anionic groups or groups convertible thereto, such as sulfonate, sulfinate, phenolate, disulfimide, carboxylate or sulfamoyl groups.

DESCRIPTION OF PREFERRED EMBODIMENT

In a preferred embodiment, the dye releaser using according to the present invention release dyes corresponding to the following general formula III:

radical containing at least one ballast group via the substituent L. The link of the dye to the carrier radical is explained by the example of the dyes (III) (X=H). In the case of the corresponding dye-releasers, in this formula, X represents CAR, wherein CAR represents a carrier radical containing at least one ballasting group. The carrier radicals may have different structures depending on the function thereof.

The dye-releasers according to the present invention may be, for example, non-diffusing color couplers which contain a dye residue according to the present invention in the coupling position and release this residue as the result of a chromogenic coupling. Releasing mechanisms of this type are described, for example, in German Pat. No. 1,095,115 and in U.S. Pat. No. 3,227,550.

However, redox active dye-releasers of the following type have proved to be particularly advantageous:

BALLAST-REDOX-DYE wherein
BALLAST represents a ballasting group;
REDOX represents a group which may be oxidized or reduced under the conditions of alkaline development and, depending on whether it is present in oxidized or in reduced condition, it is subject to a varying extent to an elimination reaction, a nucleophilic displacement reaction or to hydrolysis, with the result that the readical DYE is split off; and
DYE represents the radical of a diffusible dye, in the present case a dye of formula II.

The radicals which are to be considered as ballasting radicals are those which allow the dye-releasers according to the present invention to be incorporated in diffusion-resistant manner in the hydrophilic colloids which are usually used for photographic materials. Organic radicals are preferred for this purpose which generally contain straight or branched-chain aliphatic groups, generally having from 8 to 20 carbon atoms, and option-

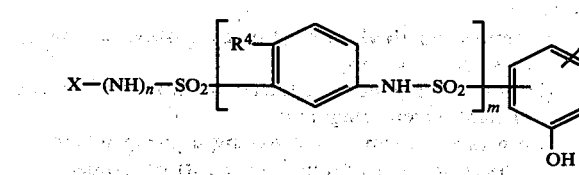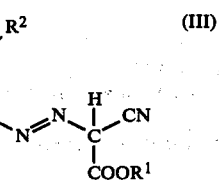

wherein
X represents H;
R$^1$ represents alkyl, alkenyl or cycloalkyl having up to 8 carbon atoms;
R$^2$ represents H or Cl;
R$^4$ represents H, Cl, —CH$_3$, —OCH$_3$ or —OC$_2$H$_5$;
m represents 0 or 1; and
n represents 0 or 1.

It is peculiar to the dyes of formula II according to the present invention that the absorption spectra of the dye releasers in the non-complexed form are not only shifted towards shorter wavelengths, but above all have greatly reduced extinction values.

Formulae II and III (X=H) relate to the diffusible dyes according to the present invention which are released during development. They are released from corresponding incorporated non-diffusing color-providing compounds (dye releasers). These are compounds in which a dye radical of formula II is linked to a carrier ally also carbocyclic or heterocyclic, optionally aromatic groups. These radicals are linked to the other part of the molecule either directly or indirectly, for example, via one of the following groups; —NHCO—, NHSO$_2$—, —NR—, wherein R represents hydrogen or alkyl, —O— or —S—. The ballasting radical may also contain water solubilising groups, such as sulfo groups or carboxyl groups which may also be present in anionic form. Since the diffusion properties depend on the molecular size of the complete compound which is used, it suffices in certain cases, for example, when the complete molecule which is used is large enough, also to use shorter-chain radicals as ballasting radicals.

Redox-active carrier radicals CAR of the BALLAST-REDOX structure and corresponding dye-releasers are known in general.

Oxidizable dye-releasers which, after oxidation, are subject to hydrolysis, with the release of a diffusible dye, are described, for example, in the following German Offenlegungsschrift Nos. 2,242,762; 2,406,664; 2,505,246; 2,613,005 and 2,645,656 and in the following Research Disclosure Publications: No. 15 157 (November 1976), No. 15 654 (April 1977) and No. 17 736 (January 1979). These are mainly compounds in which a dye radical is linked to an oxidizable carrier radical via a sulfonamide group. Accordingly, the dye which is released during development has a sulfamoyl group.

Oxidizable dye-releasers which in oxidized form are subject to an intra-molecular displacement reaction with the release of a diffusible dye are described, for example, in U.S. Pat. No. 3,443,940. Dyes having sulfinate groups are released from these dye-releasers.

Examples of oxidizable carrier radicals from the oxidized form of which a dye radical which is linked thereto is released are specified in the following:

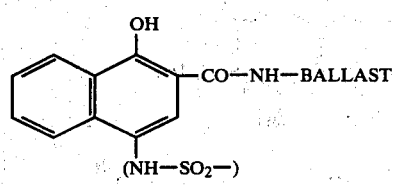

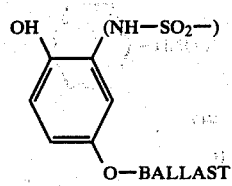

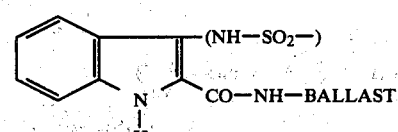

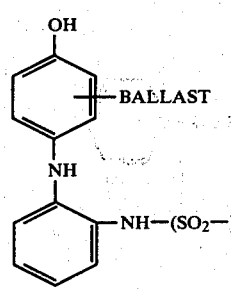

The groups in brackets are released together with the dye radical. They remain as functional groups in the form of the substituent L or of a component thereof in the dye to which, accordingly, they are either linked directly or via an intermediate member.

In the hitherto mentioned types of dye-releasers, the dye radicals are released proportionally to the formation rate of an oxidation product by the development of silver halide or by catalytic amplification, for example, with $H_2O_2$. Thus, this principle functions as a negative process and for the production of positive images, it requires a reversal, e.g. by using direct-positive emulsions or by a layer arrangement functioning by the principle of silver salt diffusion.

It is particularly advantageous when the carrier radical having a ballast group and a redox part is constructed such that the diffusible azo dye is released in an approximately reversed proportional manner to the development condition of the silver halide layer under alkaline conditions. In this case, it is a system which operates in positive manner from the very beginning and is suitable for the production of positive images using conventional negative silver halide emulsions. Dye-releasers of this type are also known and are described in the following.

Oxidizable dye-releasers which are stable in oxidized form, but which in non-oxidized form are subject to an intra-molecular nucleophilic displacement reaction with the release of a dye radical are described, for example, in German Offenlegungsschrift Nos. 2,402,900 and 2,543,902.

Oxidizable dye-releasers which are stable in oxidized form, but which in non-oxidized form release the dye in an elimination reaction are described in German Offenlegungsschrift Nos. 2,823,159 and 2,854,946.

The action of the two last-mentioned groups of dye-releasers may be reversed when compounds of this type are not used in reduced form, but in oxidized form. In this manner, the types of dye-releasers which are mentioned in the following are obtained.

Reducible dye-releasers which, after reduction are subject to an intra-molecular nucelophilic displacement reaction with the release of a dye radical are described in German Offenlegungsschrift No. 2,809,716. These compounds are termed so-called "BEND compounds" (BEND="Ballasted Electron-accepting Nucelophilic Displacement").

Reducible dye-releasers which, after reduction, are subject to an elimination reaction with the release of a dye are described in the published European Patent application No. 4399 and in British Patent application No. 80 12242.

Further classes of reducible dye-releasers which may be split reductively according to similar reaction methods with the release of dyes are described in German Offenlegungsschrift Nos. 30 08 588 and 30 14 669.

Examples of reducible carrier radicals from which a dye radical linked thereto is split off reductively are stated in the following:

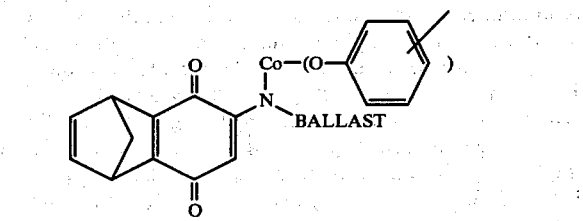

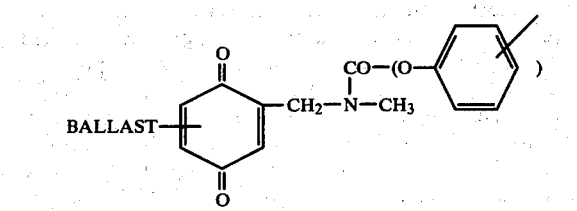

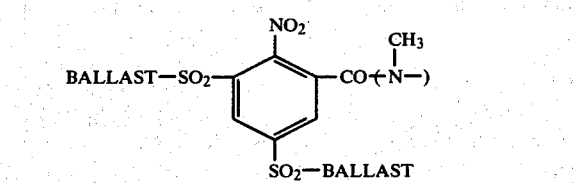

-continued

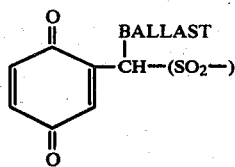

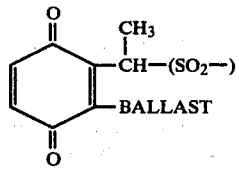

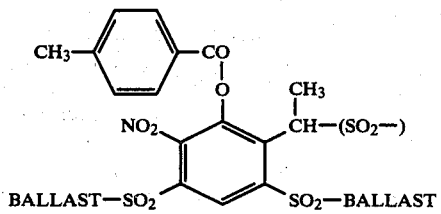

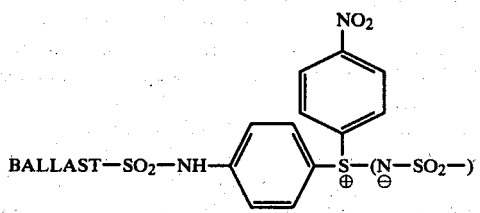

The groups in brackets are functional groups of the dye radical and are split from the remaining part of the carrier radical as substituent L or as a component thereof together with the dye. The functional group may exert a direct influence on the absorption and complex-forming characteristics of the dyes (II) according to the present invention. However, it may also be separated from the chromophore of the dye according to the present invention by an intermediate member, in that it is contained in the substituent L, in which case the absorption and complex-forming characteristics will not necessary be influenced by the functional groups. However, the functional group optionally together with the intermediate member may be significant for the diffusion and mordanting behaviour of the dyes according to the present invention. Suitable intermediate members, are for example, alkylene, arylene and phenylsulfamoyl groups.

The last-mentioned classes of reducible and reductively splitable dye-releasers are appropriately used together with so-called "electron donor compounds" (ED compounds). The latter act as a reducing agent which is used up image-wise during the development of the silver halide and reduces the associated dye-releaser with its unconsumed portion and thus causes the release of the dye. Suitable ED compounds are, for example, non-diffusible or only slightly diffusible derivatives of hydroquinone, benzisoxazolone, p-aminophenol or ascorbic acid (e.g. ascorbyl palmitate) which are described, for example, in German Offenlegungsschrift No. 2,809,716. Particularly favourable ED compounds are described in German Offenlegungsschrift Nos. 30 06 268.

Examples of suitable ED compounds are specified in the following:

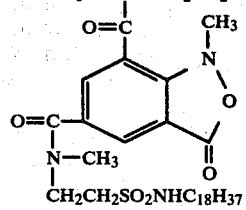

ED 1

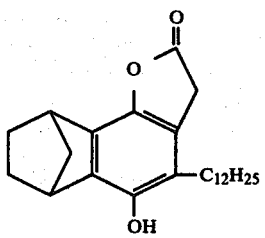

ED 2

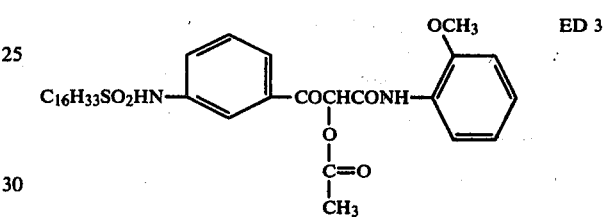

ED 3

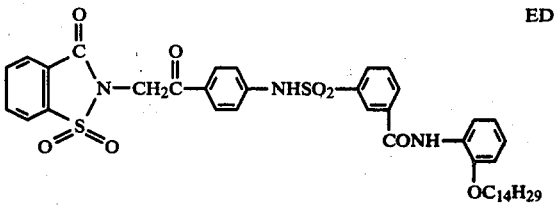

ED 4

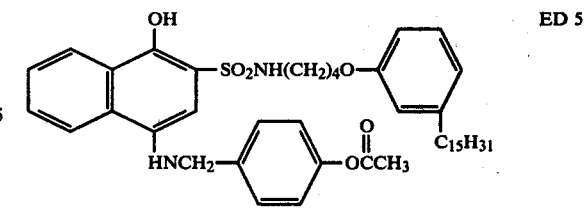

ED 5

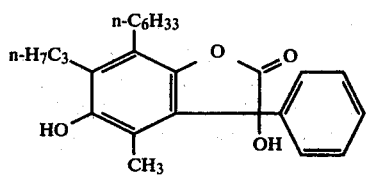

ED 6

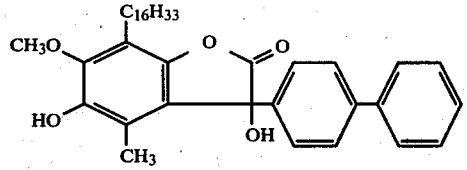

ED 7

Examples of monoazo dyes (II) according to the present invention which may be metallized to yellow nickel or copper complexes having a particularly favourable light-fastness are stated in the following:

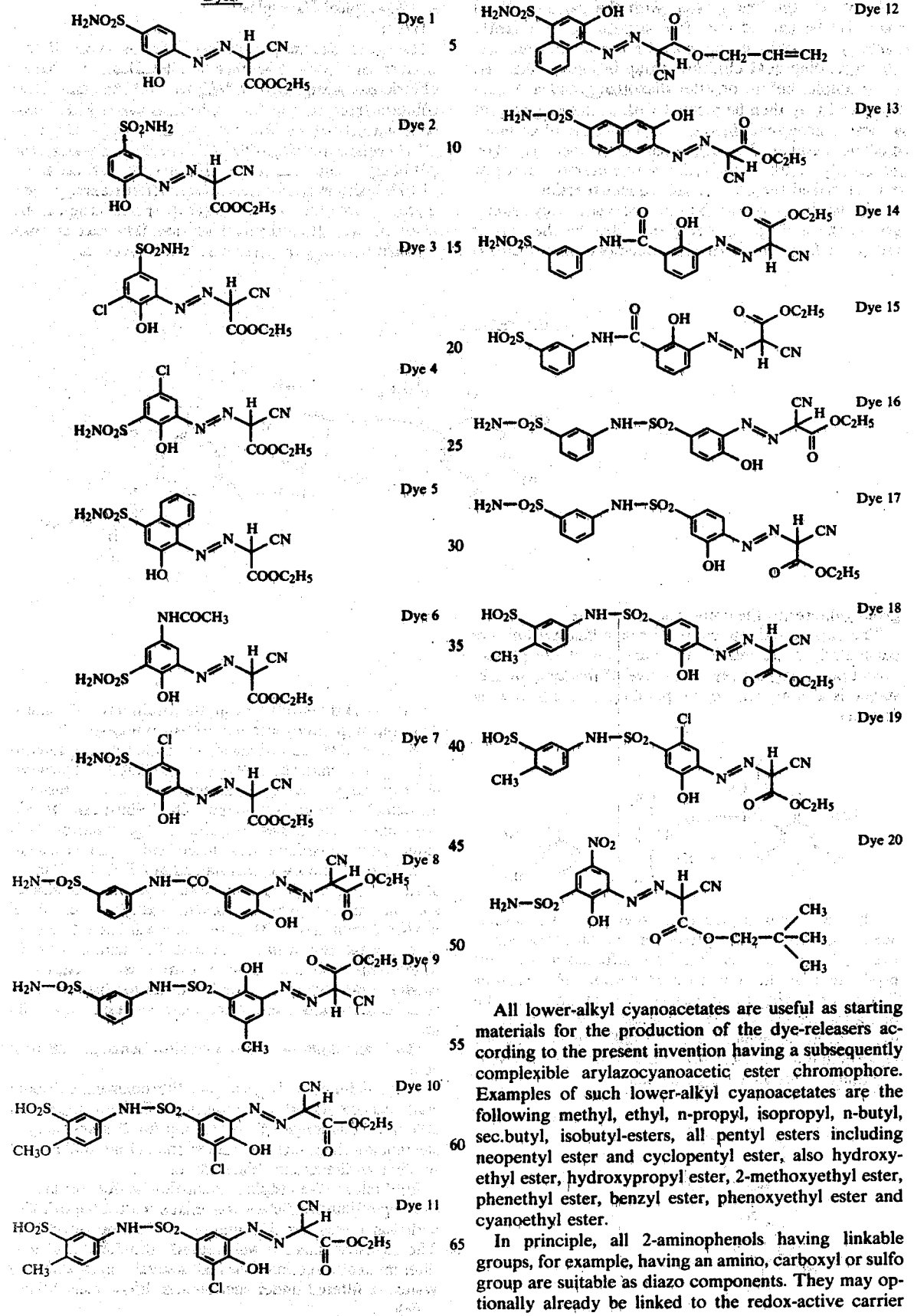

All lower-alkyl cyanoacetates are useful as starting materials for the production of the dye-releasers according to the present invention having a subsequently complexible arylazocyanoacetic ester chromophore. Examples of such lower-alkyl cyanoacetates are the following methyl, ethyl, n-propyl, isopropyl, n-butyl, sec.butyl, isobutyl-esters, all pentyl esters including neopentyl ester and cyclopentyl ester, also hydroxyethyl ester, hydroxypropyl ester, 2-methoxyethyl ester, phenethyl ester, benzyl ester, phenoxyethyl ester and cyanoethyl ester.

In principle, all 2-aminophenols having linkable groups, for example, having an amino, carboxyl or sulfo group are suitable as diazo components. They may optionally already be linked to the redox-active carrier radical during the diazotizing process, i.e. in the form of so-called "carrier-aminophenols".

However, the linking step with the carrier radical may also be carried out after diazotizing. A linkable carboxyl or sulfo group may be converted into the corresponding acid chloride group in known manner, for example, before or after diazotizing and azo coupling and may then be reacted with an amino group of an amino group-modified carrier radical or of an intermediate member. The intermediate member may then be already linked to the redox-active carrier radical or may be linked thereto in a subsequent reaction.

The linking may also be effected via an acyl amino group, the acyl group being provided by the carrier radical or from an intermediate member and the amino group adheres to the aminophenol residue.

The carrier-aminophenols with a sulfamoyl link are particularly preferred for the purposes of the present invention. A typical representative of this type of substance is a compound corresponding to the following formula:

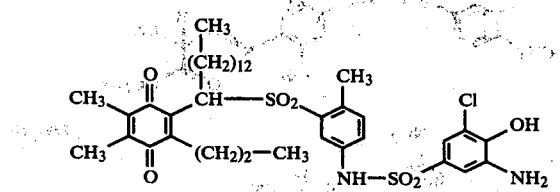

The 2-hydroxyarylazocyanoacetic ester sulfonic acids according to the present invention are so stable that they may be converted into sulfochlorides for the production of the dye-releasers without the phenolic OH group having to be masked. The methods for this operation are known and do not need to be explained in more detail. A typical dye sulfochloride for the use according to the present invention is a compound corresponding to the following formula:

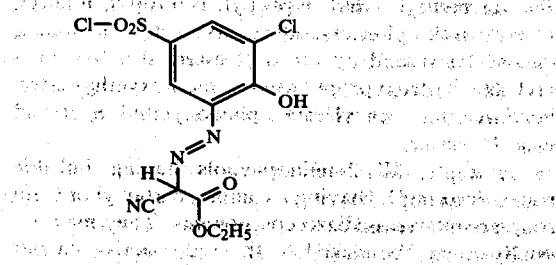

The production of the dyes and dye-releasers according to the present invention is described in the following in a few typical Examples.

Dye 1

18.8 g of 2-aminophenol-5-sulfonamide was diazotized in conventional manner in 150 ml of 5 N hydrochloric acid using 7 g of NaNO$_2$ at 5° C. The diazonium solution freed from nitrite with urea was added dropwise with stirring at from 0° to 5° C. to 12 g of cyanoethyl acetate and 100 g of K$_2$CO$_3$ in 200 ml of water, the pH being maintained at from about 11 to 12 by addition of 10% sodium hydroxide solution. After standing overnight, the mixture was adjusted to pH 5 using acetic acid and was filtered under suction. The mixture was purified by being dispersed with 40% acetic acid.

Dye-releaser 1

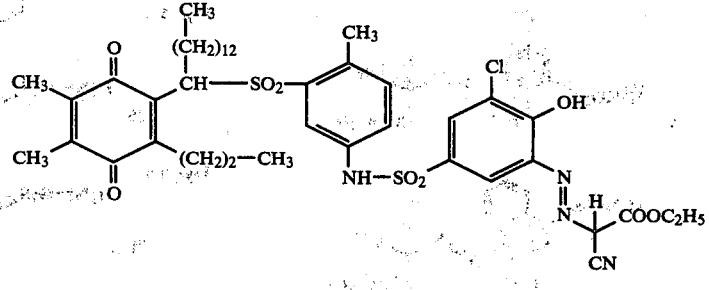

(a) 2,3-dimethyl-5-propyl-6-[α-(2-methyl-5-aminobenzene sulphonyl)-tetradecyl]-benzoquinone-1,4

30 ml of 20% sulfuric acid was added dropwise with stirring to a mixture of 19.6 g of 2,3-dimethyl-5-propyl-6-(α-hydroxytetradecyl-hydroquinone (the preparation of which is described in published European Patent Application No. 0 004 399) and 11.1 g of 2-methyl-5-aminobenzene sulfinic acid in 300 ml of glacial acetic acid. The mixture was maintained at 60° C. for 15 minutes, 30 g of iron(III)chloride hexahydrate was added and the mixture was then maintained at 60° C. for a further 20 minutes. 300 ml of water was stirred in and, after crystallization has occurred, the mixture was filtered under suction. The mixture was subsequently washed with water, digested with hot methanol, re-filtered under suction and dried under vacuum. Yield: 28 g.

(b) 3-acetamino-4-acetoxy-5-chlorobenzene sulfonic acid 150 g of 3-amino-4-hydroxy-6-chlorobenzene sulfonic acid was acetylated in the presence of 2 ml of H$_2$SO$_4$ in 500 ml of acetanhydride by heating for 2 hours using a steam bath, then filtered under suction after cooling and washed with acetone. Yield 156 g.

(c) 7-chloro-2-methylbenzoxazole-5-sulfochloride 100 g of intermediate b was mixed with 150 g of PCl$_5$ and was stirred for 150 minutes at from 60° to 65° C. The liquefied mixture was poured onto 2,000 g of ice, filtered under suction, washed several times with ice water, re-filtered under suction and dried. Yield 81 g.

(d)

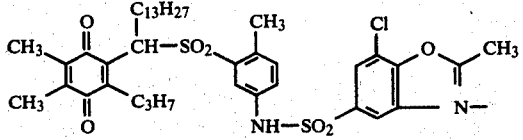

33 g of intermediate a were reacted in 400 ml of dichloromethane with the solution of 20 g of intermediate c in 200 ml of dichloromethane, after adding 22 ml of pyridine. After stirring for 6 hours at room temperature, a further 5 g of intermediate c in 50 ml of dichloromethane was subsequently added. The reaction mixture was left to stand overnight, was evaporated and digested three times, each time with 100 ml of water. Yield 68 g of solids.

(e)

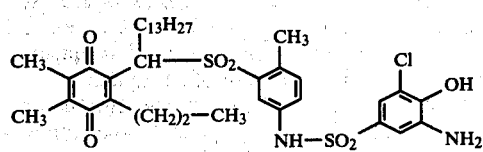

68 g of intermediate d was refluxed for 1 hour with 350 ml of ethanol and 30 ml of 37% hydrochloric acid, then cooled, filtered from undissolved material, concentrated and introduced into 2000 ml of ice water. After standing overnight, the mixture was decanted from solid residue, subsequently washed with water and dried. Yield 45 g.

(f)

7.2 g of intermediate e were diazotized using 1.6 ml of nitrosyl sulfuric acid at from $-10°$ to $-5°$ C. in 72 ml of acetone after adding 1.5 ml of $H_2SO_4$ (98%). The mixture was then further stirred for 60 minutes at 0° C. and was introduced into a suspension of 2 g of cyanoacetic ester and 9 g of potassium carbonate in 30 ml of acetone. The mixture was further stirred overnight, introduced into 400 ml of water and digested until it solidified, was decanted, taken up in dichloromethane and subjected to column chromatography on silica gel with dichloromethane/methanol as eluent. Yield: 6.7 g of brownish-yellow flakes.

Dye-releaser 2

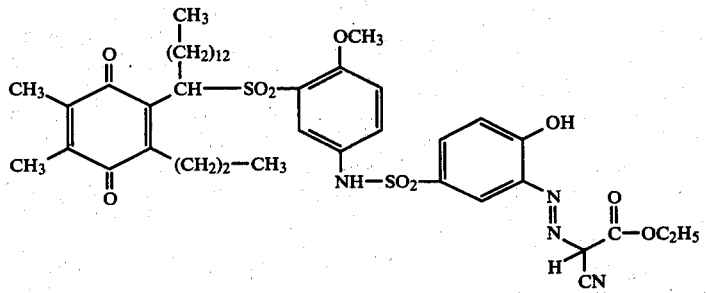

(g) 2,3-dimethyl-5-n-propyl-6-[α-(2-methoxy-5-aminophenyl sulphonyl)-tetradecyl]-benzoquinone-1,4
Preparation analogous to intermediate a from 2,3-dimethyl-5-n-propyl-6-(α-hydroxytetradecyl)-benzoquinone-1,4 and 2-methoxy-5-aminobenzenesulfinic acid; yield quantitative, brownish-yellow oil.

(h) 2-benzoyloxy-5-chlorosulfonylphenylazo-cyanoethyl acetate
Preparation from the benzoylated dye-sulfo acid with $PCl_5$, brownish-yellow friable composition.

(i) Dye-releaser 2:
Intermediates g and h were combined in dichloromethane, adding equivalent quantities of pyridine at from 5° to 10° C. and after 5 hours, were poured into 10% Na-acetate solution. The dichloromethane phase was predried using a molecular sieve and was subjected to chromatographic adsorption on silica gel. The evaporation residue was again subjected to chromatographic adsorption over silica gel.

The thin-layer chromatographic control shows that the first fraction contains small quantities of benzoylated compound.

Dye-releaser 1

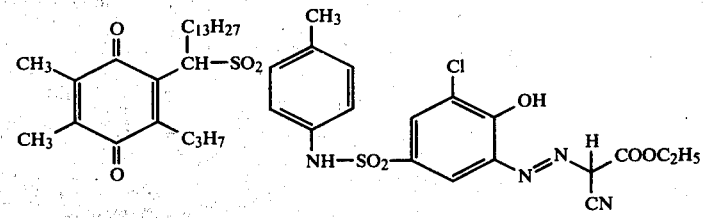

Dye-releaser 3

-continued

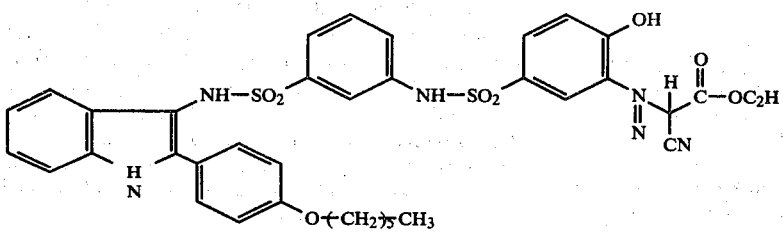

(j) 2-(4-cetyloxyphenyl)-3-(3-aminobenzene sufonamide)indole:

Prepared from 2-(4-cetyloxyphenyl)-3-aminoindole (details in German Offenlegungsschrift No. 2,505,248, page 15, therein: preparation of color-providing compound 4) by reaction with 3-nitrobenzene sulfochloride and by catalytic reduction.

Dye-releaser 3:

Intermediates j and h were combined in dichloromethane in the presence of twice the molar quantity of pyridine. The mixture was allowed to react completely overnight under $N_2$, 10% aqueous Na-acetate solution was added and the mixture was stirred for a further 8 hours.

The dichloromethane phase was then separated, dried using molecular sieve (Bayer zeolite) and purified over silica gel. The main fraction was isolated and concentrated: pale yellow powder, yield 50%.

The dye-releasers according to the present invention are incorporated into a color photographic recording material for the dye diffusion transfer process, being associated to a photosensitive silver halide emulsion layer. In monochromatic processes, a recording material of this type contains at least one photosensitive silver halide emulsion layer and in processes for the production of multi-coloured images, the material generally contains at least three such layers, in this case, the layers have a different spectral sensitivity, and according to the present invention, a dye-releaser of formula III (X=CAR) is associated to at least one of these layers. During development, the dye-releasers release in image distribution, diffusible pale yellow dyes which, after diffusion into an image receiving layer, complex with nickel or copper ions to form bright yellow image dyes. Thus, the dye-releasers according to the present invention are preferably associated to a blue-sensitive silver halide emulsion layer.

The terms "association" and "associated" are to be understood to mean that the mutual arrangement of photosensitive silver halide emulsion layer and dye-releaser is such that, during development, an interaction is possible therebetween which allows the diffusible azo dye which may be complexed by metal ions to be released as a function of the development of the silver halide emulsion layer. For this purpose, the photosensitive silver halide and the dye-releaser do not necessarily have to be in the same layer. They may also be positioned in neighbouring layers which in each case belong to the same layer unit.

If the dye-releasers according to the present invention are reducible, reductively splitable compounds which were appropriately used together with ED compounds (or with the precursors thereof, e.g. according to German Offenlegungsschrift No. 30 06 268), the term "association" is to be understood to mean that the mutual arrangement of silver halide emulsions, ED compound or ED precursor compound and dye-releaser is such that an interaction is possible therebetween which allows an imagewise conformity between the silver image formed and the consumption of ED compound, on the one hand, and between the unconsumed ED compound and the dye-releaser on the other hand, so that in conformity with the undeveloped silver halide, an imagewise distribution of diffusible dye is produced.

Although the most varied methods are employed for incorporating the dye-releasers according to the present invention, it has proved to be favourable to incorporate the present dye-releasers into the layers in the form of emulsions using so-called "oil-formers". Particularly when using reducible, reductively-splitable dye-releasers combined with ED compounds, there is the advantage that the dye-releaser and the ED compounds may be brought into particularly close and functional contact in the form of a common emulsion. Suitable oil-formers are described, for example, in U.S. Pat. No. 2,322,027 and in German Offenlegungsschrift Nos. 1,772,192; 2,042,659 and 2,049,689. The optimum quantities of the dye-releaser and optionally of the ED compound to be incorporated may be determined by simple routine tests. The present dye-releasers are used, for example, in quantities of from 0.05 to 0.2 mols and the ED compounds, if present, are used in quantities of from 0.1 to 0.6 mols per mol of silver halide.

The development of the color photographic recording material according to the present invention which is image-wise exposed is initiated by a treatment with an aqueous alkaline, optionally highly-viscous developer solution. The auxiliary developer compounds which are required for development are either contained in the developer solution or may be partly or completely contained in one or more layers of the present color photographic recording material. During development, dyes which are diffusible are released imagewise from the dye-releasers and are transferred to an image-receiving layer which is either an integral component of the present color photographic recording material or is at least in contact therewith during the time of development. Thus, the image-receiving layer may be positioned on the same support as the photosensitive element or on a separate support. The layer substantially consists of a binder which contains mordants for fixing the diffusible dyes which are released from the nondiffusing dye-releasers. Long-chain quaternary ammonium or phosphonium compounds are preferably used as mordants for anionic dyes, e.g. such compounds which are described in U.S. Pat. Nos. 3,721,147 and 3,271,148. Specific metal salts and the hydroxides thereof which form difficultly soluble compounds with the acidic dyes may also be used. Furthermore, polymeric mordants should also be mentioned here, such as those which are described in German Offenlegungsschrift Nos. 2,315,304 2,631,521 or 29 41 818.

The dye mordants are dissolved or dispersed in the mordant layer in one of the conventional hydrophilic binders, e.g. in gelatine, polyvinyl pyrrolidone or in completely or partially hydrolysed cellulose esters. Of course, some binders may also function as mordants, e.g. polymers of N-methyl-2-vinyl pyridine, as described, for example, in U.S. Pat. No. 2,484,430. Other mordanting binders which may be used are, for example, guanyl hydrazone derivatives of alkyl vinyl ketone polymers, as described, for example, in U.S. Pat. No. 2,882,156, or guanyl hydrazone derivatives of acyl styrene polymers, as described, for example, in German Offenlegungsschrift No. 2,009,498. However, other binders, e.g. gelatine are generally added to the last-mentioned mordanting binders.

Moreover, in the present case, the image-receiving layer or a neighbouring layer may contain heavy metal ions, in particular copper or nickel ions, which form the corresponding azo dye-metal complexes with the tridentate azo dyes according to the present invention which diffuse into the image-receiving layer, said complexes having the advantageous characteristics which have been mentioned with respect to absorption and stability. The metal ions may be present in the image-receiving layer in complex-bound form, for example, bound to specific polymers as described, for example, in Research Disclosure 18 534 (September 1979) or in German Offenlegungsschrift Nos. 30 02 287 and 31 05 777. However, it is also possible to produce azo dye-metal complexes in the image-receiving layer after diffusion, in that this layer having the imagewise distribution resulting therein of dyes according to the present invention is treated with a solution of a salt of one of the heavy metals mentioned. The dye-releasers of formula III (X=CAR) retained imagewise (as negative to the transfer image) in the originally photosensitive layers during development may also be converted into the corresponding azo-dye metal complexes by treating with heavy metal ions ("retained image"). In any case, the dye image produced using the color photographic material according to the present invention consists of an imagewise distribution of metal complexes in a binder layer, in particular of nickel or copper complexes of the dye-releasers of formula III (X=CAR) or of the azo dyes of formula II or of formula III (X=H) released therefrom and optionally of other dyes. When producing a transfer image, the binder layer is the image-receiving layer in which the transferred dyes are fixed as metal complexes optionally by the mordant contained therein, and when producing a so-called "retained image", the imagewise distribution of the metal complexes formed from the dye-releasers themselves is present in a layer of the originally photosensitive element.

As far as the image-receiving layer remains in layer-contact with the photosensitive element, even after development, an alkali-permeable pigmented light-reflecting binder layer is usually located therebetween which is used for the optical separation between the negative and positive and as an aesthetically attractive image background for the transferred dye image. A light-reflecting layer of this type may already be pre-formed in known manner in the photosensitive color photographic recording material or it may not be produced until during development, likewise in known manner. If the image-receiving layer is positioned between the support and the photosensitive element and is separated from the latter by a pre-formed light-reflecting layer, either the support must be transparent, so that the dye transfer image which is produced may be viewed through the support, or the photosensitive element together with the light-reflecting layer must be removed from the image-receiving layer in order to expose the latter. However, the image-receiving layer may also be present as the top layer in an integral color photographic recording material, in which case exposure is appropriately effected through the transparent support.

WORKING EXAMPLE 1

Image-receiving layer 1

The following layers were applied to a paper support which was coated on both sides with polyethylene. All numbers relate to 1 square meter.

(1) Mordant layer, containing 6 g of cationic polyurethane according to Example 3 of German Offenlegungsschrift No. 2,631,521, and 5 g of gelatine.

(2) Hardening layer, containing 0.1 g of gelatine and 0.15 g of immediate hardening agent corresponding to the following formula:

Two strips of the resulting image-receiving material were each immersed into 0.03 molar solutions of the dyes, 1, 2, 3, 4, 5, 6, 7 and 8 which were alkaline-adjusted using 2% soda lye, and they were immersed until the dried layer had a density of at least 1.0, measured behind a blue filter.

Moreover, two strips were each dyed in a solution prepared in the same manner of one of the following dyes:

Comparative Dye A

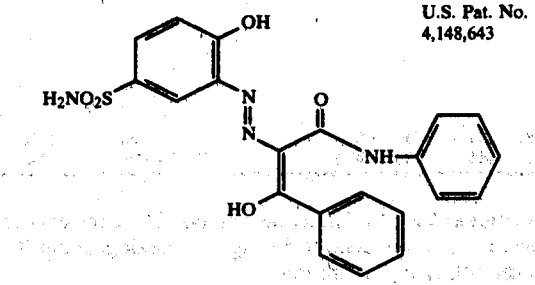

U.S. Pat. No. 4,148,643

Comparative Dye B

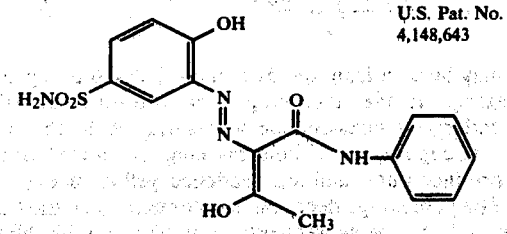

U.S. Pat. No. 4,148,643

Comparative Dye C

-continued

U.S. Pat. No. 4,148,641

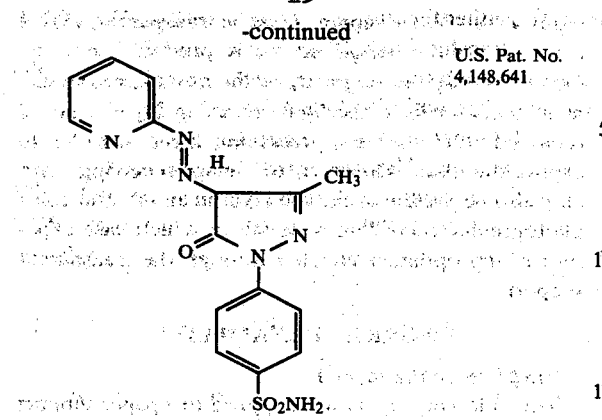

The spectral properties of the complexed dye may be seen in the following Table.

| Dye | λmax [nm] | λHB [nm] | Data nickel complexes Secondary densities behind | | ΔF | $\frac{\Delta D}{Do}$ |
|---|---|---|---|---|---|---|
| | | | Green Filter | Red Filter | | |
| 1 | 440 | 500 | 17% | 6% | +100% | −2% |
| 2 | 430 | 500 | 17% | 8% | +120% | −3% |
| 3 | 436 | 492 | 13% | 6% | +65% | −6% |
| 4 | 420 | 496 | 30% | 17% | +160% | −7% |
| 5 | 451 | 510 | 20% | 8% | +51% | — |
| 6 | 420 | 490 | 30% | 20% | +175% | −15% |
| 7 | 436 | 492 | 19% | 9% | +190% | −8% |
| 8 | 444 | 510 | 20% | 10% | +80% | −2% |
| A: | 455 | 525 | 30% | | +45% | −30% |
| B: | 465 | 530 | 33% | | +60% | −40% |
| C: | 455 | 520 | 30% | | +85% | −2% |

In column 6 of the Table, the symbol ΔF represents the increase in color density during complexing, according to the following definition:

$$\Delta F = \frac{D_{Ni\text{-}complex} - D_{Dye}}{D_{Dye}}$$

It may be seen from the data in the Table that, by complexing, the dyes according to the present invention; undergo a considerable intensification in the color strength even without masking (acylation), and produce purer and less reddened yellow shades.

The percentage decrease in color density of the transfers which are subsequently complexed with Ni++, after radiation in a Xeno test device is entered in column 7, (4.8·10⁶ lux.h.; [αD/Do ]).

It may be seen from the data that the nickel complexes of 2-hydroxyphenylazocyanoacetic ester dyes are predominantly more light-fast than the nickel complexes of the comparative dyes.

$\lambda_{HB}$ represents the position of the longwave sides, characterized by the wavelength at which the extinction has dropped to half the value of $\lambda_{max}$.

WORKING EXAMPLE 2

Photosensitive element 1 (not according to the present invention)

The following layers were successively applied to a paper support which was coated on both sides with polyethylene. All the numbers relate to 1 square meter.

1. An unsensitized silver bromo-iodide emulsion layer of 0.5 g of AgNO₃ containing 0.3 g of the dye-releaser A which is not according to the present invention, 0.16 g of ED compound 6 (=compound 4 of German Offenlegungsschrift No. 30 06 268), 0.46 g of palmitic acid diethylamide (common oil-former for dye-releaser and ED compound) and 1.15 g of gelatine.
2. A protective layer containing 0.6 g of monoacetylation product of 4-methyl-4-hydroxymethylphenidone, 0.12 g of 2-isooctadecyl-5-sulfohydroquinone and 0.6 g of gelatine.
3. A hardening layer containing 0.1 g of gelatine and 0.12 g of immediate hardening agent, see Example 1.

Dye-releaser A=quinone of compound 20 of European patent application No. 0004399, corresponding to the following formula:

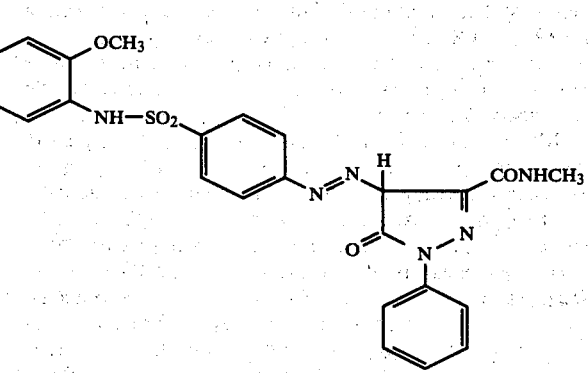

The photosensitive element which is exposed imagewise through a step wedge and a strip of image-receiving element 1 (see Example 1) were saturated with a treatment solution of the following composition and were compressed on the layer side.

925 g of H₂O
30 g of isobutanol
2 g of Na₂SO₃
3 g of KBr, and
40 g of KOH.

After a contact time of 2 minutes, the sheets were separated from each other and the image-receiving element was rinsed for 30 seconds. After drying, the Dmin/Dmax values of the positive yellow color wedge 1 were measured.

Photosensitive elements 2 and 3:
(according to the present invention)
The photosensitive elements 2 and 3 differ from element 1 insofar as photosensitive element 2 contains: 0.4 g of dye-releaser 1, 0.2 g of ED compound 6, and
photosensitive element 3 contains: 0.4 g of dye-releaser 2, 0.25 g of ED compound 6.

Moreover, the emulsions each contain 0.9 g of palmitic acid dimethylamide instead of 0.46 g of palmitic acid diethylamide. Processing was carried out as for the photosensitive element 1 in contact with the image-receiving element 1. After separating, the image-receiving elements are rinsed with deionized water and are metallized by immersing into 2% nickel acetate solution. They are then neutralized by a succinic acid buffer solution (2% of succinic acid, adjusted to pH 6) and are dried, and the Dmin/Dmax values are then determined.

Half the side of the resulting color wedges 1 to 3 is covered and the wedges are subjected to a xenon arc exposure lasting for 48 hours ($4.8 \cdot 10^6$ lxh).

Light-fastness and photographic data are provided in the following Table.

| Photosensitive element | Colour former | $D_{min}$ | $D_{max}$ | E [rel · log I · t] | $\frac{\Delta D}{D_0}$ |
| --- | --- | --- | --- | --- | --- |
| 1 | A | 0.19 | 2.1 | 100 | −15% |
| 2 | 1 | 0.18 | 1.95 | 140 | −2% |
| 3 | 2 | 0.16 | 1.85 | 125 | −3% |

It may be seen from the data that both the increased sensitivity due to the low extinction of the unmetallised colour formers 1 and 2, as well as the increased light-fastness of the nickel complexes compared to a conventional yellow dye appear as a commercial advantage.

We claim:

1. In a color photographic recording material for the production of colored images by the dye diffusion transfer process, comprising at least one photosensitive silver halide emulsion layer and associated thereto a nondiffusing color-providing compound, capable of releasing under the conditions of alkaline development and as a function of the development of the silver halide emulsion layer, a diffusible azo dye which can complex with metal ions, the improvement according to which the released azo dye in one of its tautomeric forms corresponds to the following general formula II

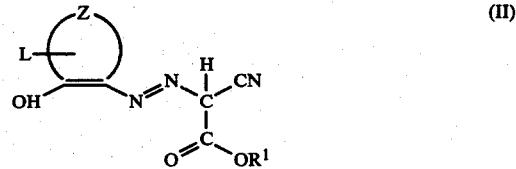

(II)

wherein
$R^1$ represents alkyl, alkenyl or cycloalkyl having up to 8 carbon atoms,
Z represents a radical required for completing a benzene or naphthalene ring; and
L represents a substituent having a group which results from the splitting from a carrier radical.

2. The recording materials as claimed in claim 1, wherein the diffusible azo dye which can complex with metal ions corresponds to the following general formula III

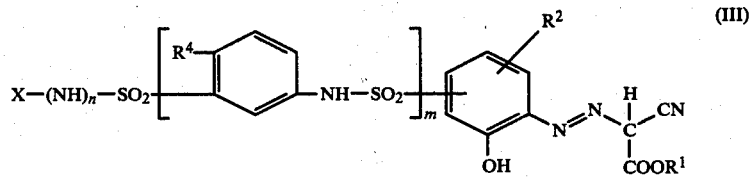

(III)

wherein
X represents H;
$R^1$ represents alkyl, alkenyl or cycloalkyl having up to 8 carbon atoms;
$R^2$ represents H or Cl;
$R^4$ represents H, Cl, —CH$_3$, —OCH$_3$ or —OC$_2$H$_5$,
m represents 0 or 1, and
n represents 0 or 1.

* * * * *